United States Patent
Thubert et al.

(10) Patent No.: US 10,009,256 B2
(45) Date of Patent: Jun. 26, 2018

(54) HYBRID ROUTING TABLE FOR REACHING UNSTABLE DESTINATION DEVICE IN A TREE-BASED NETWORK

(71) Applicant: Cisco Technology, Inc., San Jose, CA (US)

(72) Inventors: Pascal Thubert, La Colle sur Loup (FR); Jean-Philippe Vasseur, Anchorage, AK (US); Patrick Wetterwald, Mouans Sartoux (FR); Eric Michel Levy-Abegnoli, Valbonne (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 129 days.

(21) Appl. No.: 15/002,322

(22) Filed: Jan. 20, 2016

(65) Prior Publication Data
US 2017/0207967 A1    Jul. 20, 2017

(51) Int. Cl.
*H04L 12/707* (2013.01)
*H04L 12/44* (2006.01)
*H04L 12/751* (2013.01)
*H04L 12/26* (2006.01)
*H04L 12/24* (2006.01)

(52) U.S. Cl.
CPC .............. *H04L 45/22* (2013.01); *H04L 12/44* (2013.01); *H04L 45/02* (2013.01); *H04L 41/12* (2013.01); *H04L 43/0805* (2013.01)

(58) Field of Classification Search
CPC ..... H04L 41/0836; H04L 12/44; H04L 45/02; H04L 45/22; H04L 45/34; H04W 40/02; H04W 84/02
USPC ........................................................ 370/254
See application file for complete search history.

(56) References Cited

U.S. PATENT DOCUMENTS 7,778,235 B2    8/2010 Thubert et al.
2004/0213167 A1*  10/2004 Garcia-Luna-Aceves    H04L 45/02
                                                      370/254

(Continued)

OTHER PUBLICATIONS

Cisco, "Cisco Connected Grid Security for Field Area Netowrk", [online], White Paper, 2012, [retrieved on Jan. 11, 2016]. Retrieved from the Internet: <URL: http://www.cisco.com/c/dam/en_us/solutions/industries/docs/energy/C11-696279-00_cgs_fan_white_paper.pdf>, pp. 1-6.

(Continued)

*Primary Examiner* — Obaidul Huq
(74) *Attorney, Agent, or Firm* — Leon R. Turkevich

(57) ABSTRACT

In one embodiment, a method comprises: a root network device of a tree-based network topology identifying an instability in an identified child device attaching within the tree-based network topology; the root network device generating and storing in a routing information base table, for each sub-child device reachable via the identified child device, a corresponding source-route path starting with the identified child device and ending at the corresponding sub-child device; the root network device adding, to the routing information base table, a current path for reaching the identified child device, enabling the root network device to generate a path for reaching any one sub-child device using the corresponding source-route path via the current path of the identified child device.

15 Claims, 4 Drawing Sheets

(56) References Cited

U.S. PATENT DOCUMENTS

2007/0223368 A1* 9/2007 Ozaki ............... H04L 41/0659
370/216
2010/0260197 A1* 10/2010 Martin ............... H04L 12/4625
370/408

OTHER PUBLICATIONS

Cisco, "Cisco 2010 Connected Grid Router", [online], Data Sheet, 2011, [retrieved on Jan. 11, 2016]. Retrieved from the Internet: <URL: http://www.cisco.com/c/en/us/products/collateral/routers/2000-series-connected-grid-routers/data_sheet_c78_593509.pdf>, pp. 1-11.

Winter et al., "RPL: IPv6 Routing Protocol for Low-Power and Lossy Networks", Internet Engineering Task Force (IETF), Request for Comments: 6550, Mar. 2012, pp. 1-157.

Vasseur, "Terms Used in Routing for Low-Power and Lossy Networks", Internet Engineering Task Force (IETF), Request for Comments: 7102, Jan. 2014, pp. 1-8.

Shelby et al., "The Constrained Application Protocol (CoAP)", Internet Engineering Task Force (IETF), Request for Comments: 7252, Jun. 2014, pp. 1-112.

Wikipedia, "List of ad hoc routing protocols", [online], Dec. 17, 2015, [Retrieved on Jan. 7, 2016]. Retrieved from the Internet: <URL: https://en.wikipedia.org/w/index.php?title=List_of_ad_hoc_routing_protocols&printable=yes, 3 pages.

Wikipedia, "Loose Source Routing", [online], Aug. 18, 2014, [retrieved on Jan. 11, 2016]. Retrieved from the Internet: <URL: https://en.wikipedia.org/w/index.php?title=Loose_Source_Routing& printable=yes>, 1 page.

Vasseur, Ed., et al., "Routing Metrics Used for Path Calculation in Low-Power and Lossy Networks", Internet Engineering Task Force, Request for Comments: 6551, Mar. 2012, pp. 1-30.

Thubert, Ed., "Objective Function Zero for the Routing Protocol for Low-Power and Lossy Networks (RPL)", Internet Engineering Task Force (IETF), Request for Comments: 6552, Mar. 2012, 14 pages.

* cited by examiner

HYBRID ROUTING TABLE FOR REACHING UNSTABLE DESTINATION DEVICE IN A TREE-BASED NETWORK

TECHNICAL FIELD

The present disclosure generally relates to a hybrid routing table for reaching an unstable destination device in a tree-based network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing metrics (advertised in the DIO) to a prescribed objective function of the RPL instance. The "child" network device, upon attaching to its parent, can output its own DIO with updated metrics that enable other network devices to discover the DODAG, learn the updated metrics, and select a DODAG parent.

Each child network device can unicast, up to the DODAG root, a destination advertisement object (DAO) message that identifies the child network device and its DODAG parent: if the DODAG is implemented in non-storing mode, the DODAG root creates a source-route path to a destination device based on recursively identifying the successive parents between the destination and DODAG root, as identified in the received DAO messages.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
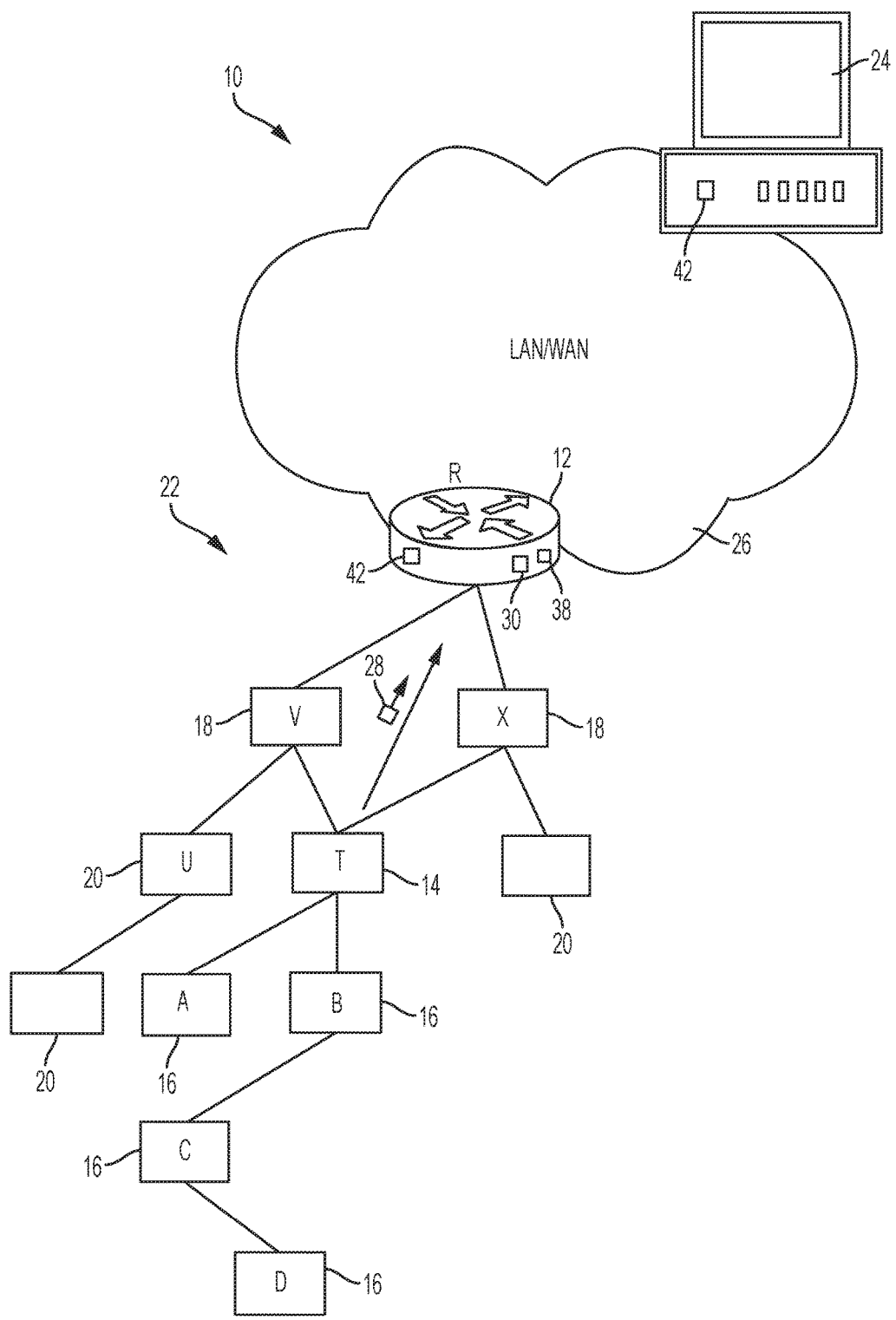
FIG. 1 illustrates an example network having an apparatus generating a path for reaching a destination based on concatenating a first path, from the apparatus to an identified unstable child device, with a second source-route path from the unstable child device to the destination, according to an example embodiment.

In one embodiment, a method comprises: a root network device of a tree-based network topology identifying an instability in an identified child device attaching within the tree-based network topology; the root network device generating and storing in a routing information base table, for each sub-child device reachable via the identified child device, a corresponding source-route path starting with the identified child device and ending at the corresponding sub-child device; the root network device adding, to the routing information base table, a current path for reaching the identified child device, enabling the root network device to generate a path for reaching any one sub-child device using the corresponding source-route path via the current path of the identified child device.

In another embodiment, an apparatus comprises a device interface circuit, a memory circuit, and a processor circuit. The device interface circuit is configured for advertising the apparatus as a root network device of a tree-based network topology. The memory circuit is configured for storing a routing information base table. The processor circuit is configured for identifying an instability in an identified child device attaching within the tree-based network topology. The processor circuit further is configured for generating and storing in the routing information base table, for each sub-child device reachable via the identified child device, a corresponding source-route path starting with the identified child device and ending at the corresponding sub-child device. The processor circuit further is configured for adding, to the routing information base table, a current path for reaching the identified child device, enabling the processor circuit to generate a path for reaching any one sub-child device using the corresponding source-route path via the current path of the identified child device.

In another embodiment, one or more non-transitory tangible media are encoded with logic for execution by a machine, and when executed by the machine operable for: a root network device of a tree-based network topology identifying an instability in an identified child device attaching within the tree-based network topology; the root network device generating and storing in a routing information base table, for each sub-child device reachable via the identified child device, a corresponding source-route path starting with the identified child device and ending at the corresponding sub-child device; the root network device adding, to the routing information base table, a current path for reaching the identified child device, enabling the root network device to generate a path for reaching any one sub-child device using the corresponding source-route path via the current path of the identified child device.

DETAILED DESCRIPTION

Particular embodiments enable a root network device in a tree-based network topology to maintain reachability to each of its child network devices, despite an intermediate network device affecting reachability to sub-child devices (attached to the intermediate network device) by switching between different parent devices. Each of the child network devices in the tree-based network topology operate in a non-storing mode. The root network device can identify a child device demonstrating an instability (also referred to as a "flapping child device"), and in response create separate and distinct truncated source-route paths for each of the sub-child devices of the flapping child device in its routing information base table: the root network device establishes a distinct truncated source-route path that starts with the flapping child device and ends at the corresponding sub-child device. The network device also can add, to its routing information base table a current path for reaching the flapping child device.

Hence, a network device (e.g., the root network device of a DODAG or a storing-mode parent network device of a sub-DAG) can generate a path for reaching any one sub-child device of the flapping child device by concatenating the current path to the flapping child device with the corresponding truncated source-route path between the flapping child device and the one sub-child device. Consequently, the network device can maintain reachability to destination network devices in the tree-based network topology, despite an instability by a flapping child device moving between attachment points in the tree-based network topology. The example embodiments enable the root network device to establish a routing information base table that minimizes the need to recalculate source-route paths due to unstable network devices, and which minimizes the need for recursive look-ups in a routing information base to determine paths for reaching destination devices.

FIG. 1 illustrates an example network 10 having an apparatus "R" 12 configured for identifying instability in an identified child device "T" 14, and maintaining reachability to sub-child devices 16 despite the instability of the identified child device "T" 14, according to an example embodiment. The apparatus 12, also referred to as a "network device" 12, can be implemented as a RPL network device having constrained processing power, memory, and/or energy (e.g., battery power). The apparatus 12 is illustrated as a root network device of different child network devices, including for example the flapping child device 14, child devices that can serve as a parent network device 18 for the flapping child device 14, sub-child devices (e.g., "A", "B", "C", and/or "D") 16 that are reachable only via the flapping child device 14 (i.e., within the sub-DAG of the flapping child device 14), and other network devices 20 that are not associated with the flapping child device 14 in the tree-based network topology 22 (i.e., are reachable via one of the other parent network devices 18). Hence, the tree-based topology 22 comprises a plurality of RPL network devices 12, 14, 16, 18, and 20, and is rooted by a root network device (i.e., "root") 12.

Any of the network devices 14, 16, 18, and/or 20 can be attached to a parent network device in the tree-based network topology 22 by wired or wireless data links. The root network device 12 can have a wired or wireless data link with one or more of the RPL network devices 14, 16, 18, and/or 20, and the root network device 12 also can have a wired or wireless data link to an access router (not shown) providing reachability to a network device 24 via a local area network (LAN) and/or wide area network (WAN) 26. Although FIG. 1 illustrates the tree-based topology 22 as a tree rooted at the root network device 12, any one of the network device 14, a sub-child device 16, a parent network device 18, or any one of the other RPL network devices 20 could have two or more data links to a "parent device", such that the topology 22 could be implemented as a DAG or a DODAG under RFC 6550. Hence, the topology 22 also can be referred to herein as a DODAG.

Figure 2:
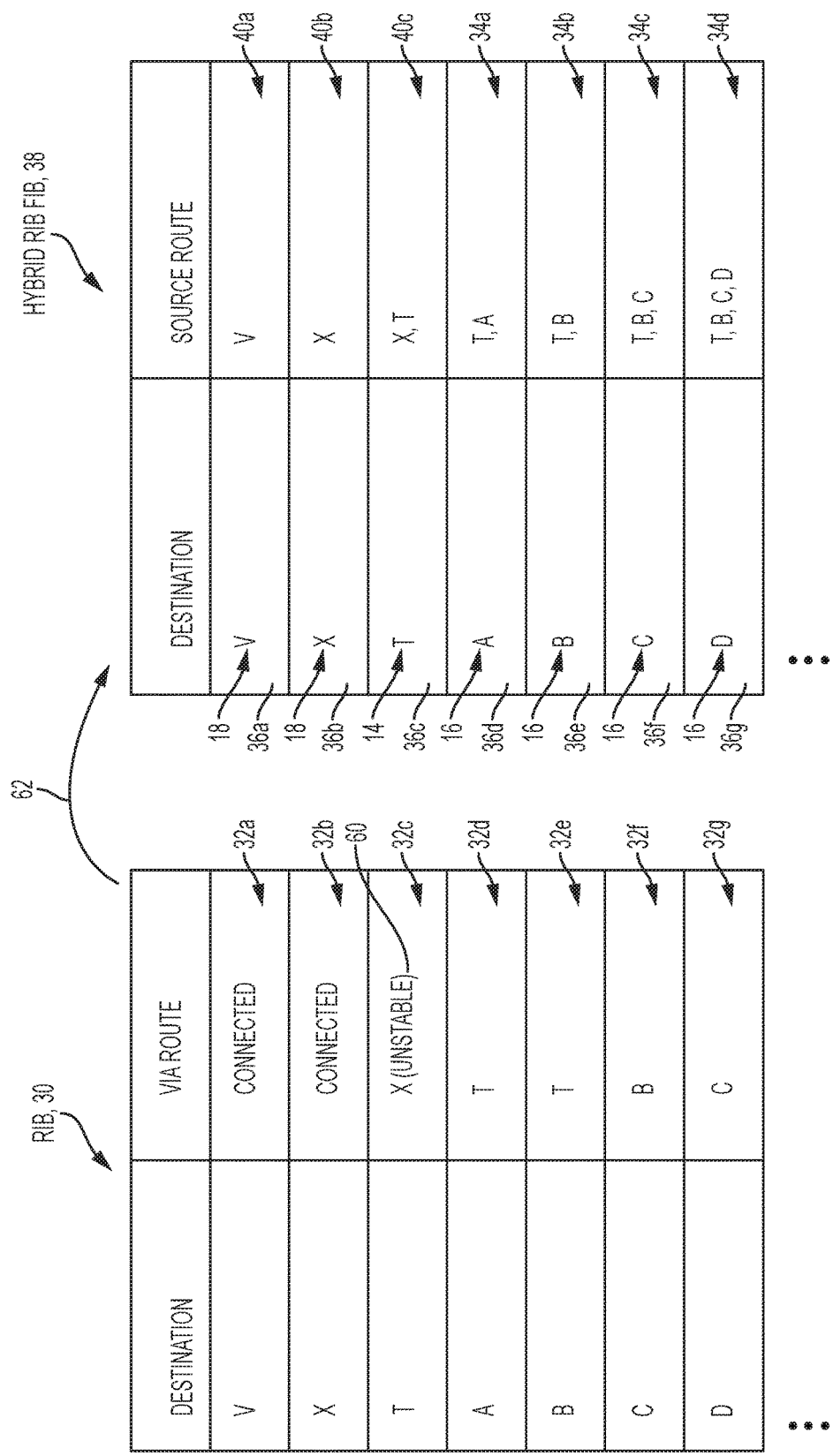
FIG. 2 illustrates example data structures stored in the root network device for generating a path for reaching a destination based on concatenating a first path, from the root network device to an identified unstable child device, with a second source-route path from the unstable child device to the destination, according to an example embodiment.

The Internet Engineering Task Force (IETF) Request for Comments (RFC) 6550 describes DODAG formation, where a network device 14, 16, 18, and/or 20 can select one or more attachment points to the tree-based network topology 22 based on receiving DIOs from respective parent network devices in the tree-based network topology 22, each DIO specifying prescribed attributes of the corresponding parent network device (e.g., 12, 14, or 18) in the tree-based network topology 22. A RPL network device (e.g., 14) can apply one or more prescribed optimization objectives (i.e., Objective Function) to identify one or more attachment points based on the metrics specified in the DIOs, in order to reach the root network device 12 at a minimal path cost. The RPL network device responds to attachment in the tree-based network topology 22 by generating a destination advertisement (DAO) message 28 specifying the new parent device of the RPL network device, and unicast transmitting the DAO message 28 to the root network device 12. The root network device 12 can respond to the updated DAO message 28 by updating its routing information base (RIB) topology table (30 of FIGS. 1 and 2) to specify, in a corresponding topology table entry 32, the current parent device (e.g., "X" 18) of the child device "T" 14.

Conventional implementations of a root network device according to RFC 6550 can include the root network device generating a forwarding information base (FIB) table entry that stores a corresponding full-source route path for each destination device based on recursive analysis of the parent-child relationships in the RIB topology table 30. For example, conventional implementations could cause a root network device to generate a source-route path "X-T-B-C-D" for reaching the destination device "D" 16 based on recursively: identifying from the topology table entry 32g that the parent device for the sub-child device "D" 16 is the sub-child device "C" 16; identifying from the topology table entry 32f that the parent device for the sub-child device "C" 16 is the sub-child device "B" 16; identifying from the topology table entry 32e that the parent device for the sub-child device "B" 16 is child device "T" 14; identifying from the topology table entry 32c that the parent device for the child device "T" 14 is the parent network device "X" 18; and identifying from the topology table entry 32b that the parent device for the network device "X" 18 is "connected" (i.e., directly connected to the root network device 12). Hence, a conventional root network device would store in a FIB table entry that the destination device "D" 16 is reachable via the source-route path "X-T-B-C-D": this source-route path is valid only as long as no network device changes its point of attachment in the tree-based network topology 22. The "unstable" flag 60 in the topology table entry 32 is not a part of conventional implementations of the RIB topology table 30 as described above, rather the "unstable" flag 60 is added according to example embodiments as described below with respect to FIG. 4.

Instances may arise where a network device "T" 14, also referred to as a flapping child device 14, can demonstrate instability in the tree-based network topology 22 by changing attachment points between different parent network devices (e.g., "X", "V") 18 and/or the root network device "T" 12, and outputting an updated destination advertisement object (DAO) message 28 specifying an updated parent device. For example, the flapping child device 14 can be a mobile RPL device that can change its point of attachment between the parent network device "X" 18, the parent network device "V" 18, and/or the root network device 12, for example due to changing network conditions as detected by the flapping child device 14 relative to the network devices "X", "V", and "R"; the flapping child device 14 also sends an updated DAO message 28 that specifies its updated parent network device. Hence, the change in point of attachment by the flapping child device 14 (e.g., from the parent network device "X" 18) to another parent device (e.g., to parent network device "V" 18 or the root network device "R" 12) conventionally would require that the root network device 12 recalculate a new full-source route path for each sub-child device (e.g., "A", "B", "C", and "D") 16 reachable via the flapping child device "T" 14 for updating of the FIB table entries, based on the above-described recursive lookup using the RIB topology table 30. Moreover, any network traffic destined for any destination sub-child device 16 and transmitted between the time the flapping child device 14 changes its point of attachment and the root network device 12 recalculates a new source-route path would result in lost packets, especially in network deployments that continue to transmit network traffic until an Internet Control Message Protocol (ICMP) message is detected that specifies the destination sub-child device 16 is unreachable.

According to example embodiments, the root network device 12 can eliminate the necessity of recalculating source-route paths for sub-child devices 16 reachable only via a flapping child device 14: the root network device 12 can eliminate the necessity of source-route path recalculation for the sub-child devices 16 based on identifying an instability in the flapping child device 14, generating for each sub-child device 16 a corresponding truncated source-route path (34 of FIG. 2) starting with the flapping child device 14 and ending at the corresponding sub-child device 16, and storing the truncated source-route path 34 in a corresponding table entry 36 of a hybrid RIB-FIB table 38. The hybrid RIB-FIB table 38 also is configured for storing a source-route path 40 for a parent network device 18, the flapping child device 14, and any of the other network devices 20.

Hence, the example embodiments enable the root network device 12 to generate a (fully-source routed) path for reaching a destination sub-child device (e.g., "D" 16) based on concatenating a first path (e.g., "X-T") 40c from the apparatus 12 to a child device "T" 14 identified as an unstable child device, with a second (truncated) source-route path (e.g., "T-B-C-D") 34d from the unstable child device "T" 14 to the destination sub-child device (e.g., "D" 16). Consequently, the root network device 12 can maintain reachability to the sub-child devices 16, despite the instability of the flapping child device 14 switching between different attachment points, by updating only the corresponding hybrid RIB-FIB table entry 36c to specify the updated source-route path 40c for the flapping child device 14 in response to the updated DAO message 28, without the necessity of recalculating source-route paths for each of the sub-child devices 16. As described in further detail below, the instability in the flapping child device 14 can be detected by an instability detection resource (42 of FIG. 1) that can be executed in the root network device 12 and/or an instability detection device 24 that is reachable via the LAN/WAN.

Figure 3:
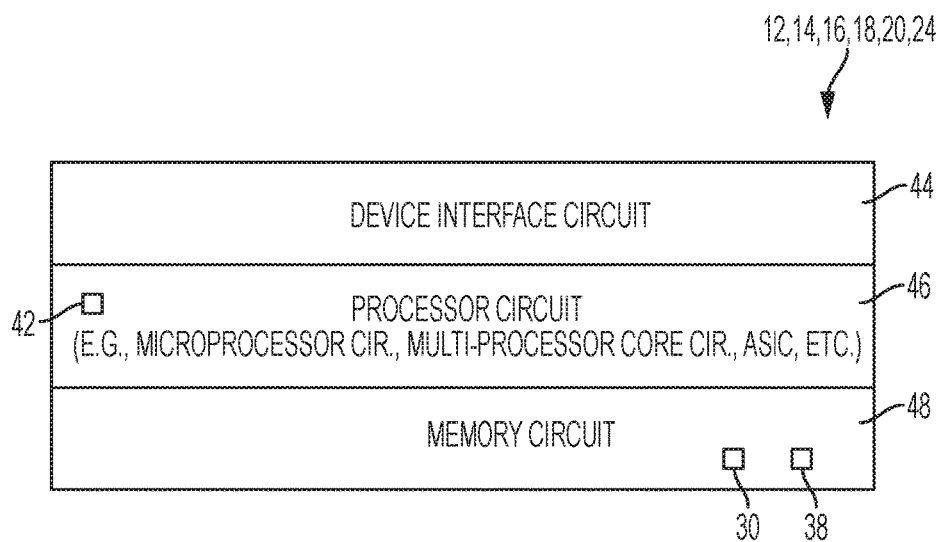
FIG. 3 illustrates an example implementation of any one of the network devices of FIG. 1, according to an example embodiment.

FIG. 3 illustrates an example implementation of any one of the devices 12, 14, 16, 18, 20, and/or 24 of FIG. 1, according to an example embodiment. Each apparatus 12, 14, 16, 18, 20, and/or 24 is a physical machine (i.e., a hardware device) configured for implementing network communications with other physical machines 12, 14, 16, 18, 20, and/or 24 via the tree-based network topology 22 and/or the LAN/WAN 26. The term "configured for" or "configured to" as used herein with respect to a specified operation refers to a device and/or machine that is physically constructed and arranged to perform the specified operation.

Each apparatus 12, 14, 16, 18, 20, and/or 24 can include a device interface circuit 44, a processor circuit 46, and a memory circuit 48. As described herein, the RIB topology table 30 and the hybrid RIB-FIB table 38 are stored only in the memory circuit 48 of the network device operating as the root network device 12; depending on implementation, the instability detection resource 42 can be executed by the processor circuit 46 of the network device operating as the root network device 12 or of the remote device (e.g., a network controller) 24 reachable via the LAN/WAN 26; hence, the devices 14, 16, 18, or 20 typically will not execute the instability detection resource 42 or store the RIB topology table 30 or the hybrid RIB-FIB table 38 (the instability detection resource 42 also can be implemented as an ASIC in the root network device and/or the instability detection device 24). In an alternate embodiment, however, a network device (e.g., 16, 20) operating as a parent of a sub-DAG in a hybrid storing/non-storing mode tree-based topology (i.e., the network device operating in storing mode) could execute the instability detection resource 42 and maintain the RIB topology table 30 and hybrid RIB-FIB table 38 for its sub-DAG.

The device interface circuit 44 can include one or more distinct physical layer transceivers for communication with any one of the other devices 12, 14, 16, 18, 20, and/or 24; the device interface circuit 44 also can include an IEEE based Ethernet transceiver for communications with the devices of 12, 14, 16, 18, 20, and/or 24 via any of the data links illustrated in FIG. 1 (e.g., a wired or wireless link as appropriate, an optical link, etc.). The processor circuit 46 can be configured for executing any of the operations described herein, and the memory circuit 48 can be configured for storing any data or data packets as described herein.

Any of the disclosed circuits of the devices 12, 14, 16, 18, 20, and/or 24 (including the device interface circuit 44, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 4:
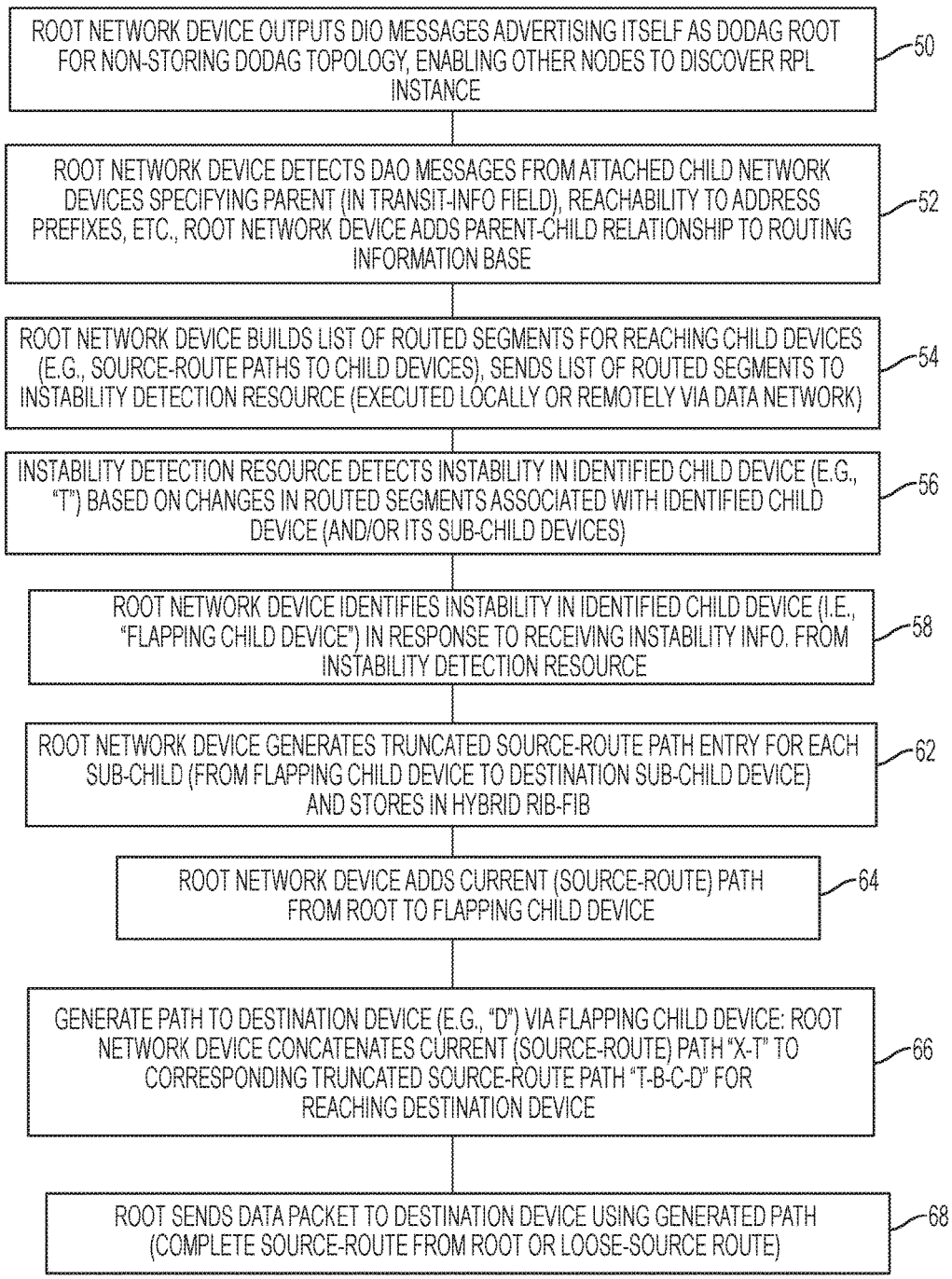
FIG. 4 illustrates an example method of a root network device generating a path for reaching a destination based on concatenating a first path, from the root network device to an identified unstable child device, with a second source-route path from the unstable child device to the destination, according to an example embodiment.

FIG. 4 illustrates an example method of a root network device 12 generating a path (e.g., full/complete source-route path "X-T-B-C-D") for reaching a destination device (e.g., "D") 16 based on concatenating a first path (e.g., "X-T") 40c, from the root network device 12 to an identified unstable child device ("T") 14, with a second (truncated) source-route path ("T-B-C-D") 34d from the unstable child device "T" 14 to the destination device "D" 16, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, the device interface circuit 44 of the root network device 12 in operation 50 is configured for outputting DIO messages (generated for example by the processor circuit 46) advertising the network device "R" 12 as a root of the tree-based network topology 22 as a non-storing topology (i.e., no network device except the root network device 12 stores any routing information). The DIO messages output by the root network device 12 enable other network devices (e.g., 14, 16, 18, and 20) to discover the RPL instance advertised by the root network device 12. Additional details with respect to DIO messages can be found in RFC 6550.

Each network device (e.g., 14, 16, 18, and 20), in response to receiving the DIO message output by the root network device 12, can attach directly as a child to at least one of the root network device 12, or another network device (e.g., devices "X" and "V" 18) having already attached to the root network device 12. As described previously, each network device (e.g., 14, 16, 18, and/or 20) responds to attaching within the tree-based network topology 22 by generating and outputting (for unicast transmission to the root network device 12) a corresponding DAO message 28 that specifies the network device and its corresponding parent device.

The device interface circuit 44 of the root network device 12 can detect each DAO message and forward the DAO message to the processor circuit 46. The processor circuit 46 of the root network device 12 in operation 52 can detect from a DAO message the source network device (e.g., "B" 16) having generated the DAO message, its corresponding parent (e.g., "T" 14) from the "transit-info" field of the DAO message, and optionally any IPv6 address prefix reachable via the source network device. The processor circuit 46 of the root network device 12 updates in operation 52 the RIB topology table 30 with a topology table entry 32 specifying the parent-child relationship between the "child" network device having transmitted the DAO message, and the corresponding parent specified in the "transit-info" field. The processor circuit 46 of the root network device 12 in operation 52 can add additional topology table entries 32 for each child device (e.g., 14, 16, 18, and/or 20), or update an existing topology table entry 32 in response to receiving a corresponding DAO message. The processor circuit 46 in operation 52 also can create and store in the hybrid RIB-FIB table 38 complete source-route paths 40 for network devices (e.g., 18, 20) that are not identified as having any instability.

The processor circuit 46 of the root network device 12 in operation 54 can send, to an instability detection resource 42, topology information for the tree-based network topology 22 based on the received DAO messages 28. For example, the processor circuit 46 of the root network device 12 can build a list of routed segments for reaching child devices (e.g., 40), and forward the list of routed segments to an instability detection device 24 executed either locally by the processor circuit 46 in the root network device 12 or remotely in an instability detection device 24 and reachable via the LAN/WAN 26. For example, the processor circuit 46 in operation 54 can generate a Constrained Application Protocol (CoAP) message (according to RFC 7252) specifying the list of routed segments, enabling the device interface circuit 44 to send the CoAP message to the instability detection device 24 via the LAN/WAN 26.

Over time the flapping child device 14 may detach and attach to different parent network devices "X" or "V" 18 (or the root network device 12) and in response send a corresponding updated DAO message 28 to the root network device 12, causing the processor circuit 46 in the root network device 12 to update the corresponding topology table entry 32c with an updated parent (e.g., "X", "V", or "R"), and update the hybrid RIB-FIB table entry 36c with an updated source-route path 40c (e.g., "X,T" if attached to parent device "X" 18, "V,T" if attached to parent device "V" 18, or "T" if attached to the root "R" 12). FIG. 1 illustrates the flapping child device 14 outputting an updated DAO message 28 in response to the flapping child device 14 attaching to the root network device 12. The processor circuit 46 of the root network device 12 can notify the instability detection resource 42 of each corresponding update of the topology table entry 32c and/or the hybrid RIB-FIB table entry 36c. Hence, the processor circuit 46 of the root network device 12 can send updated topology information for the tree-based network topology 22 in response to each topology change, including at least the updated topology table entry 32c (alternately, the processor circuit 46 of the root network device can send updated topology information on a periodic basis, for example once every minute, depending on the size of the tree-based network topology 22).

The instability detection resource 42 executed by the processor circuit 46 in the root network device 12 (or the instability detection device 24) is configured for detecting in operation 56 an instability in an identified child device (e.g., "T" 14) based on changes in the routing segments. The instability detection resource 42 executed by the processor circuit 46 in the root network device 12 (or the instability detection device 24) is implemented as a centralized entity with respect to the tree-based network topology 22 and that can detect areas in the tree-based network topology 22 encountering high instabilities, including for example the flapping child device 14.

Various techniques can be used by the instability detection resource 42 in operation 56 to detect the flapping child device 14, including for example a centralized clustering technique such as K-means or K-Nearest Neighbors (K-NN). Clustering refers to the ability of the instability detection resource 42 to group data points using similarity functions, and where the distance to a cluster is used to reflect the degree of anomaly using the Euclidian distance or a cluster based local outlier factor (CB LOF). Such clusters can be computed using a variety of inputs (including from the root network device 12), for example path segment lengths, link and nodes reliability (e.g. Link ETX), etc. Hence, the instability detection resource 42 can determine a list of "outliers" with respect to the overall path segment stability, resulting in identification of the flapping child device 14.

In response to the instability detection resource 42 detecting the instability in the flapping child device 14, the instability detection resource 42 in operation 56 can send information to the processor circuit 46 of the flapping child device 14 that specifies the instability of the flapping child device 14; for example, the instability detection resource 42 can send information in the form of one or more procedure call parameters (if executed locally in the root network device 12), or in the form of a reply CoAP message from the instability detection device 24 to the root network device 12 if the instability detection resource 42 is executed remotely in the instability detection device 24.

The processor circuit 46 of the root network device 12 in operation 58 can identify the instability of the flapping child device 14 in response to receiving the information from the instability detection resource 42 specifying the instability of the flapping child device 14; the processor circuit 46 of the root network device 12 can add, for example an instability flag "Unstable" 60 to either the topology table entry 32 and/or the hybrid RIB-FIB table entry 36c to identify the flapping child device 14 as unstable.

The processor circuit 46 of the root network device 12 in operation 62, in response to identifying the instability of the flapping child device 14 (identified for example in the RIB topology table 30 by the instability flag 60), can generate and store in the hybrid RIB-FIB table 38 truncated source-route paths 34 for each of the sub-child devices 16. As described previously, each truncated source-route path 34 starts at the flapping child device 14 and ends at the corresponding destination sub-child device 16. Hence, the processor circuit 46 of the root network device 12 in operation 62: adds the truncated source-route path "T-A" in the hybrid RIB-FIB table entry 36d for reaching the sub-child device "A" 16; adds the truncated source-route path "T-B" in the hybrid RIB-FIB table entry 36e for reaching the sub-child device "B" 16; adds the truncated source-route path "T-B-C" in the hybrid RIB-FIB table entry 36f for reaching the sub-child device "C" 16; and adds the truncated source-route path "T-B-C-D" in the hybrid RIB-FIB table entry 36g for reaching the sub-child device "D" 16. As apparent from the foregoing, the instability flag 60 can notify the processor circuit 46 that recursive access of the RIB topology table 30 to generate a source-route path should be halted.

The processor circuit 46 of the root network device 12 in operation 64 also can add (update) in operation 64 the current source-route path 40c for reaching the flapping child device 14 into the hybrid RIB-FIB table entry 36c, for example in response to detecting the instability flag 60.

Hence, the processor circuit 46 of the root network device 12 in operation 66 can generate a path to any destination sub-child device (e.g., "D") 16 via the flapping child device 14 based on concatenating the current source-route path "X-T" 40c with the corresponding truncated source-route path "T-B-C-D" 34d for reaching the destination sub-child device "D" 16, resulting in the complete source-route path "X-T-B-C-D". The processor circuit 46 of the root network device 12 in operation 68 can route data packets to the destination device (e.g., "D") 16 using the generated path. Any subsequent changes by the flapping child device "T" 14 attaching to a different parent device (e.g., parent device "V" 18) can be implemented in the hybrid RIB-FIB table 38 by updating the corresponding hybrid RIB-FIB table entry 36c to specify the updated source-route path (e.g., "V-T") 40 for reaching the flapping child device "T" 14 via its updated parent device "V" 18, since reachability of a destination sub-child device "D" 16 is maintained by concatenating the updated source-route path (e.g., "V-T") with the existing truncated source-route path "T-B-C-D" 34d, resulting in the updated source-route path "V-T-B-C-D".

Hence, the example embodiments minimize updates in the hybrid RIB-FIB table 38 to the hybrid RIB-FIB table entry 36c associated with the flapping child device 14. The example embodiments enable generation of a complete source route (via the flapping child device 14) based on a single recursion that concatenates the device interface circuit 44c with the truncated source-route path 34 for reaching the destination sub-child device 16. The example embodiments eliminate the necessity of a complete recursive recalculation of source routes for the sub-child network devices 16.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
a root network device, of a tree-based network topology in a data network, identifying an attachment instability in an identified child device changing attachment points within the tree-based network topology;
the root network device generating and storing in a routing information base table, for each sub-child device reachable via the identified child device, a corresponding source-route path starting with the identified child device and ending at the corresponding sub-child device;
the root network device adding, to the routing information base table, a current path for reaching the identified child device, enabling the root network device to generate a path for reaching any one sub-child device using the corresponding source-route path via the current path of the identified child device; and
the root network device generating the path based on concatenating the current path with the corresponding source-route path for reaching the one sub-child device;
wherein:
the current path is a current source-route path for reaching the identified child device from the root network device; and
the path for reaching the one sub-child device, generated by the root network device, is a complete source-route path for reaching the one sub-child device starting from the root network device.

2. The method of claim 1, wherein the identifying includes receiving information specifying instability of the identified child device from an instability detection resource that detects the attachment instability in the identified child device.

3. The method of claim 2, further comprising:
receiving advertisement messages from respective child devices in the tree-based network topology, each advertisement message specifying a parent device of the corresponding child device; and
sending, to the instability detection resource, topology information for the tree-based network topology based on the advertisement messages, the information specifying instability based on the topology information.

4. The method of claim 3, wherein the topology information includes a list of routed segments for reaching the child devices based on the advertisement messages, the child devices including the identified child device.

5. The method of claim 3, wherein the instability detection resource is executed in one of:
the root network device; or
a second device reachable via a second data network, wherein the root network device sends the topology information via the second data network and receives the information specifying the attachment instability from the second device via the second data network.

6. An apparatus comprising:
a device interface circuit configured for advertising the apparatus as a root network device of a tree-based network topology in a data network;
a memory circuit configured for storing a routing information base table; and
a processor circuit configured for identifying an attachment instability in an identified child device changing attachment points within the tree-based network topology, the processor circuit further configured for generating and storing in the routing information base table, for each sub-child device reachable via the identified child device, a corresponding source-route path starting with the identified child device and ending at the corresponding sub-child device;
the processor circuit further configured for adding, to the routing information base table, a current path for reaching the identified child device, enabling the processor circuit to generate a path for reaching any one sub-child device using the corresponding source-route path via the current path of the identified child device, wherein:
the processor circuit further is configured for generating the path based on concatenating the current path with the corresponding source-route path for reaching the one sub-child device;
the current path is a current source-route path for reaching the identified child device from the root network device; and
the processor circuit further is configured for generating the path for reaching the one sub-child device as a complete source-route path for reaching the one sub-child device starting from the root network device.

7. The apparatus of claim 6, wherein the processor circuit further configured is for identifying the attachment instability based on information, specifying instability of the identified child device, from an instability detection resource that detects the attachment instability in the identified child device.

8. The apparatus of claim 7, wherein:
the device interface circuit is configured for receiving advertisement messages from respective child devices in the tree-based network topology, each advertisement message specifying a parent device of the corresponding child device; and
the processor circuit configured for generating and sending, to the instability detection resource, topology information for the tree-based network topology based on the advertisement messages, the information specifying instability based on the topology information.

9. The apparatus of claim 8, wherein the topology information includes a list of routed segments for reaching the child devices based on the advertisement messages, the child devices including the identified child device.

10. The apparatus of claim 8, wherein:
the instability detection resource is executed by the root network device; or
the instability detection resource is executed in a second device reachable via a second data network, wherein the device interface circuit is configured for sending the topology information via the second data network and receiving the information specifying the attachment instability from the second device via the second data network.

11. One or more non-transitory tangible media encoded with logic for execution by a machine and when executed by the machine operable for:
a root network device, of a tree-based network topology in a data network, identifying an attachment instability in an identified child device changing attachment points within the tree-based network topology;
the root network device generating and storing in a routing information base table, for each sub-child device reachable via the identified child device, a corresponding source-route path starting with the identified child device and ending at the corresponding sub-child device;

the root network device adding, to the routing information base table, a current path for reaching the identified child device, enabling the root network device to generate a path for reaching any one sub-child device using the corresponding source-route path via the current path of the identified child device; and the root network device generating the path based on concatenating the current path with the corresponding source-route path for reaching the one sub-child device;

wherein:

the current path is a current source-route path for reaching the identified child device from the root network device; and the path for reaching the one sub-child device, generated by the root network device, is a complete source-route path for reaching the one sub-child device starting from the root network device.

12. The one or more non-transitory tangible media of claim 11, wherein the identifying includes receiving information specifying instability of the identified child device from an instability detection resource that detects the attachment instability in the identified child device.

13. The one or more non-transitory tangible media of claim 12, further operable for:

receiving advertisement messages from respective child devices in the tree-based network topology, each advertisement message specifying a parent device of the corresponding child device; and sending, to the instability detection resource, topology information for the tree-based network topology based on the advertisement messages, the information specifying instability based on the topology information.

14. The one or more non-transitory tangible media of claim 13, wherein the topology information includes a list of routed segments for reaching the child devices based on the advertisement messages, the child devices including the identified child device.

15. The one or more non-transitory tangible media of claim 13, wherein the instability detection resource is executed in one of:

the root network device; or a second device reachable via a second data network, wherein the root network device sends the topology information via the second data network and receives the information specifying the attachment instability from the second device via the second data network.

* * * * *